United States Patent

Coleman et al.

Patent Number: 6,095,885
Date of Patent: Aug. 1, 2000

[54] SPINNER CANDY TOY

[76] Inventors: Thomas J. Coleman, 19170 Paddock Pl., Abingdon, Va. 24211; William K. Schlotter, IV, 117 Wateredge La., Fredericksburg, Va. 22406; Princess Ann Coleman, 19170 Paddock Pl., Abingdon, Va. 24211; Ann M. Schlotter, 117 Wateredge La., Fredericksburg, Va. 22406

[21] Appl. No.: 09/207,987

[22] Filed: Dec. 9, 1998

[51] Int. Cl.[7] .............................. A63H 33/00; A23G 3/00
[52] U.S. Cl. ............................ 446/236; 446/231; 446/71; 426/104; 426/134
[58] Field of Search .................................. 446/236, 230, 446/231, 232, 241, 243, 71–81, 266, 36, 37, 38, 256; 40/586; 426/104, 134, 132

[56] References Cited

U.S. PATENT DOCUMENTS 5,209,692   5/1993   Coleman et al. ....................... 446/236
5,690,535  11/1997   Coleman et al. ....................... 446/236

*Primary Examiner*—Robert A. Hafer
*Assistant Examiner*—Jeffrey D. Carlson
*Attorney, Agent, or Firm*—Melvin L. Crane Agent

[57] ABSTRACT

A candy toy holder device which provides fun and visual pleasure for the consumer as well as providing a candy treat. The device includes an upper housing and a main housing which provides a support for a lollipop via a stationary stick holder secured to the main housing. The upper housing has one or more movable parts that perform a variety of movements. It may be constructed so that the movements include appendages moving around, up, down, in or out and the candy is designed to remain stationary whether or not the motion parts are active or inactive. The movements are activated by the use of a motor, a switching device and a power source. The power source is self contained within the main housing and the housing is designed in a manner that allows the battery to be replaced as well as the candy. Use of one or more gears and/or gearing systems allows the movements of parts.

2 Claims, 2 Drawing Sheets

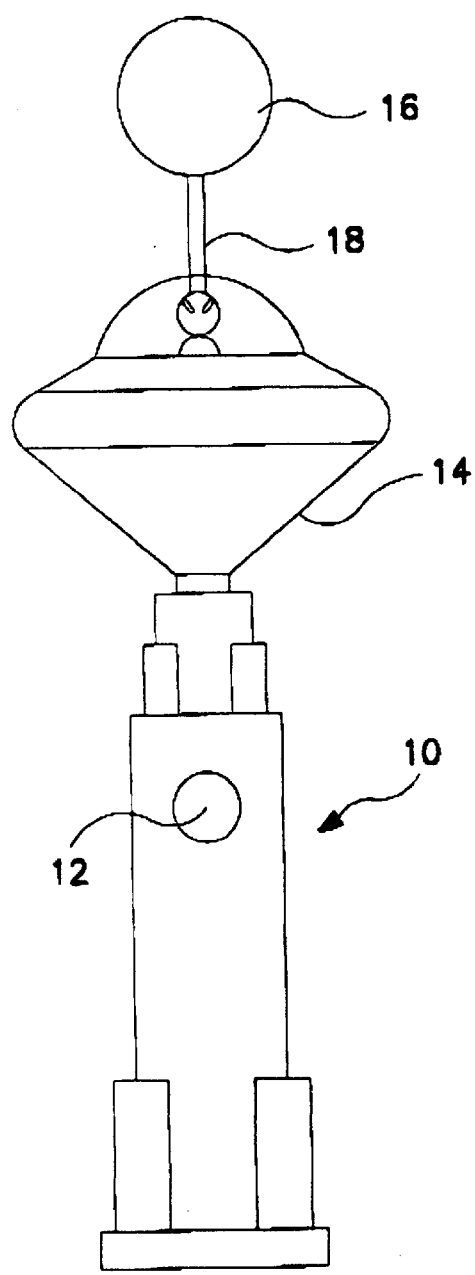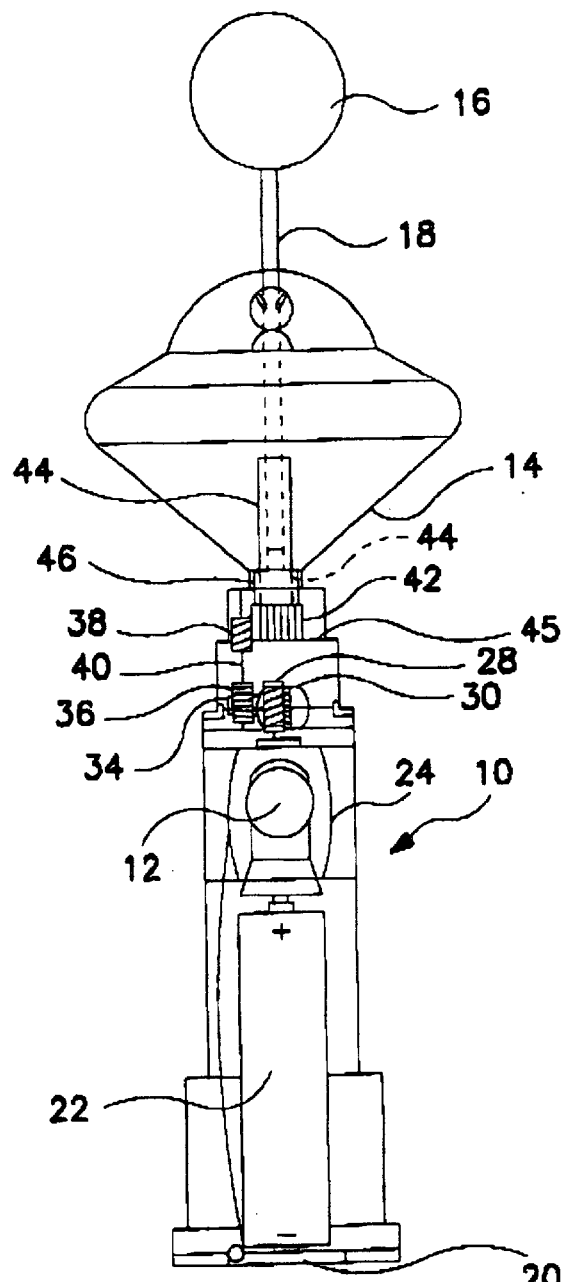

SPINNER CANDY TOY

BACKGROUND OF THE INVENTION

This invention is directed to a spinner candy toy and more particularly to a candy toy having a movable upper housing part from which a stationary candy pop is held stationary by a supporting candy stick which is inserted into a stationary candy holder.

Heretofore, the inventors have obtained patents on different devices useful with a candy pop for consumption of the candy pop and for other pleasures.

OBJECTS AND ADVANTAGES

It is therefore an object of the present invention to provide a candy pop for consumption by a user and to create a pleasurable movable part which can be operated by the user for their amusement and pleasure.

Yet another object is to provide a candy pop in which the candy pop can be replaced by another pop when the one secured to the housing has been consumed.

Still another object of the invention is to provide a candy pop device in which a housing part is movable relative to a candy stick supported by the housing and to a supporting handle.

Still another object is to provide a removable and replaceable upper housing, each of which have different shapes and/or movements such as rotatable, up and down, in or out, i.e., a car spinning around on a track, a fox chasing a chicken, a girl chasing a boy, one's arm raising up and down, as well as any other movements. Also the housing may have different drawings, characters, figures, etc.

Other objects and advantages of the invention will become obvious to those skilled in the art upon reading the specification and viewing the drawings.

BRIEF DESCRIPTION OF THE DRAWINGS

FIG. 1 illustrates a side view illustrating an overall view of the device;

FIG. 2 illustrates a cut-away view showing the relative parts of one modification of the device.

DETAILED DESCRIPTION

Figure 3A:
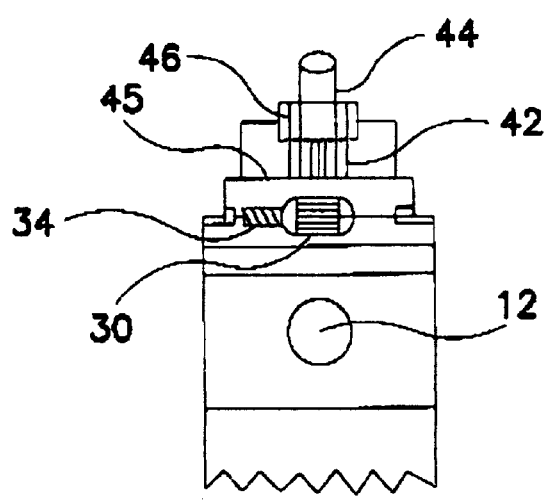
FIGS. 3a and 3b illustrate different views of the gearing system for rotating the upper housing.
Figure 3B:
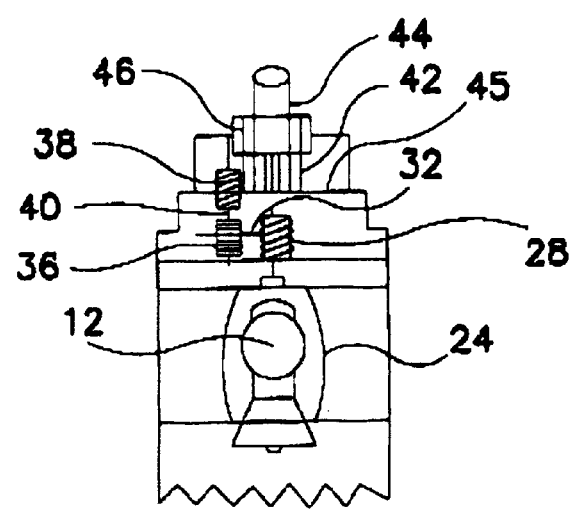

Now referring to the drawings, the different views illustrate an operative spinner candy toy wherein the same reference characters are used for the same operative parts throughout the drawings. FIG. 1 is a side view of a spinner device including a main housing 10 which can be clear plastic, a contact button control switch 12, an upper housing 14 which can be rotatable and/or have appendages which are movable relative to the upper body, a lollipop 16 on a stick 18 which is non-rotatably secured in a holder 44 which is secured to the lower body. FIG. 2 illustrates a clear plastic device illustrating a hinged cover 20 at the bottom which can be opened to insert or replace one or more batteries 22. The battery operates a motor 24 which is controlled by the switch 12. The switch can be an on-off type or one that functions only while pressed, in order to operate the motor. The motor drives a first vertical gear 28 which is rotatable around a vertical axis. The first vertical gear drives a first horizontal gear 30 via shaft 32, which in turn drives a second horizontal gear 34. The second horizontal gear drives a second vertical gear 36 which drives a third vertical gear 38 via a second shaft 40. The third vertical gear drives a fourth vertical upper housing drive gear 42 which is shown larger than the other gears in order to drive the upper housing at a slow rate. The fourth vertical gear rotates around a stationary candy stick holder 44 which is secured at a lower end thereof to a cross piece 45 in the lower housing. The upper housing rotates around the candy stick holder which passes through the upper housing drive gear 42 which functions as a bearing. The upper housing drive gear 42 is provided with a locking flange 46 which locks the lower end of the upper housing to the upper housing drive gear.

The upper housing can be of any shape and can be decorated with any amusing decorative scheme. Different upper housings can be provided so that one housing can be removed and a different decorative housing can replace the removed housing. It is therefore obvious that the bottom of each housing must be the same so that they can fit into the locking flange.

In operation, the switch 12 is closed to operate the motor. The motor then drives the gears which in turn drive the upper housing 14. Since the sucker stick is secured in a non-rotatable stationary holder, the sucker remains stationary for consumption.

It would be obvious to one skilled in the art that the sucker could be secured to the upper housing so that the sucker would rotate with the upper housing. However, as shown, the sucker is fixed in the non-rotatable holder 44 and is not rotatable.

Since the upper housing rotates, decorative parts could be added so that the decorative parts would move with the rotatable housing to present a pleasant view. The decorative parts could be made to move around, up and down, in or out, or any motion relative to the upper housing.

The foregoing relates to preferred exemplary embodiments of the invention, it being understood that other variants and embodiments thereof are possible within the spirit and scope of the invention, the latter being defined by the appended claims.

We claim:

1. A spinner candy toy comprising a stationary bottom housing for holding said spinner candy toy, a motor, battery, and motor control means in said bottom housing, an upper housing which is rotatable by said motor relative to said bottom housing, a stationary candy stick holder secured at one end to a cross piece (45) in an upper end of said stationary bottom housing which forms a bearing about which said upper housing and an upper housing drive gear (42) rotates, a lollipop on one end of a stick, and an opposite end of said stick passes through said upper housing and is secured in said stationary candy stick holder.

2. A spinner candy toy as set forth in claim 1, which includes a locking flange for securing said upper rotatable housing to an upper end of said upper housing drive gear (42).

* * * * *